H. S. CHAPIN.
VEHICLE SPRING.
APPLICATION FILED SEPT. 11, 1911.
1,034,401.
Patented July 30, 1912.
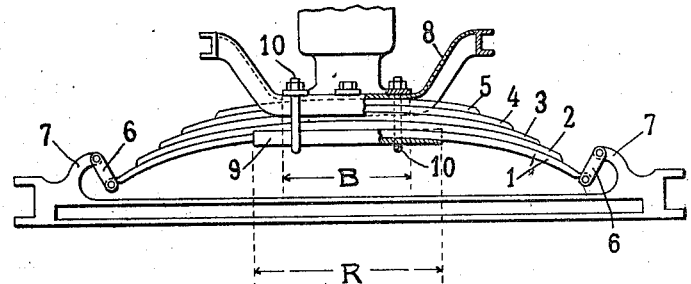
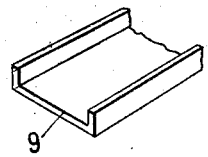
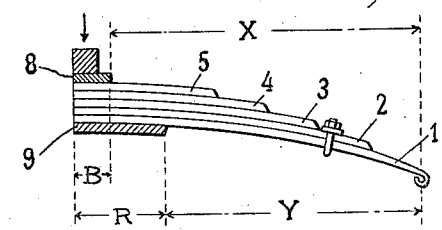
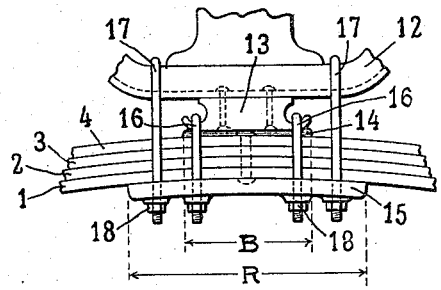
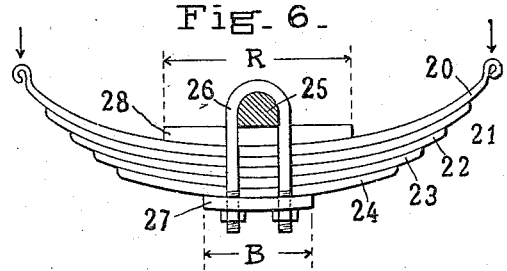
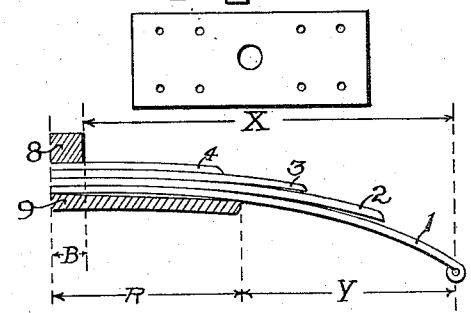
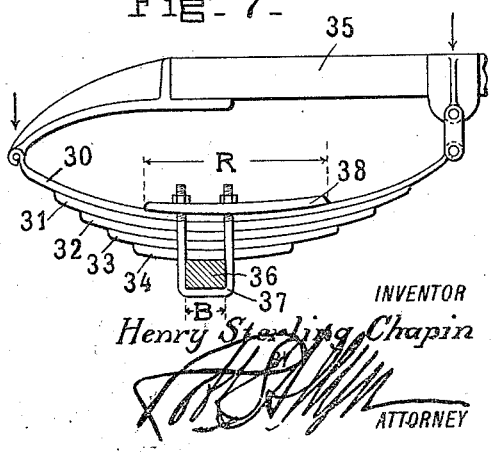
WITNESSES
J. Clyde Ripley
E. Bradford
INVENTOR
Henry Sterling Chapin
ATTORNEY

UNITED STATES PATENT OFFICE.

HENRY STERLING CHAPIN, OF ROCKVILLE CENTER, NEW YORK.

VEHICLE-SPRING.

1,034,401.   Specification of Letters Patent.   Patented July 30, 1912.

Application filed September 11, 1911. Serial No. 648,744.

*To all whom it may concern:*

Be it known that I, HENRY STERLING CHAPIN, a citizen of the United States, and resident of Rockville Center, in the county of Nassau and State of New York, have invented certain new and useful Improvements in Vehicle-Springs, of which the following is a specification.

My invention relates particularly to compound leaf springs. Such springs are in extensive use in many different forms, and are capable of sustaining great weights. Where, however, the vehicle is subjected to excessive jolting or vibrations these springs often fail. Forces tending to flatten out the spring very rarely ever cause such springs any injury but when the springs rebound from the influence of the sudden shock the longer leaves very often bend or break near the center.

It is my object to prevent such accidents and to reinforce the spring on its concave side and also to stiffen the spring and thus avoid excessive vibrations. In this way the construction acts not only as a reinforce but as a shock absorber.

The construction consists in its preferred form of a series of curved leaf springs with a bearing on the convex side and a reinforcing device on the concave side, the length of the reinforcing device on the concave side being considerably greater than the length of the bearing on the convex side so that the effective length of the spring under normal compression is considerably greater than the effective length under reaction or rebound.

The invention is applicable to many different forms of springs as suggested by the accompanying single sheet of drawings.

Figure 1, is a front elevation of a spring embodying the improvements of my invention as applied to one form of running gear of an automobile, parts being broken away and shown in section. Fig. 2, is a fragmentary perspective view of one end of the reinforcing device of Fig. 1. Fig. 3, is a fragmentary view of the central part of a modification of the construction of Fig. 1. Fig. 4, is a detail plan view of the reinforcing device of Fig. 3. Fig. 5, is a kind of diagrammatic view of a single section of an elliptic spring, or may be considered as a front elevation of one-quarter of a full elliptic spring, or one-half of a semi-elliptic spring. Fig. 6, is an elevation of another form of spring of my invention of the semi-elliptic type. Fig. 7, is a similar view of another form having the two arms of the spring of unequal lengths. Fig. 8 is a diagrammatic view of a spring embodying my invention and showing the action of the parts under excessive rebound or reaction.

According to my invention the spring is made up of a plurality of leaves such as 1, 2, 3, 4 and 5. In the form shown in Fig. 1 the ends of the lower leaf are supported by links 6, 6 from the lugs 7, 7. The load is applied in this form from the frame 8 which contacts normally with the upper leaf 5 along a line whose length is indicated by the letter B. Beneath the lower leaf 1 on the concave side of the spring is arranged a rigid reinforcing plate 9. In the form shown in Figs. 1 and 2 this reinforcing device is of channel form so as to give great rigidity without excessive weight, the flanges of the channel embracing the sides of the spring. Clips 10, 10 of the type commonly employed in springs of this character, hold the parts of the spring and the reinforcing device to the frame member 8. In this form of spring the load tending to flatten out the spring is applied on the length B. When the spring rebounds or reacts after a sudden blow or jolt, the load rises quickly relative to the supports 7, 7 and the rigid reinforcing device, 9, steadies the spring and shortens up the effective length of the leaf 1 so as to prevent excessive reaction.

In Fig. 5 it will be seen that the effective length of the spring under compression is indicated at X while the effective length under reaction is equal to Y which is much less than X. The length of the reinforcing device R is also plainly seen to be very considerably greater than the length of the bearing B.

In the form shown in Fig. 3 the frame member 12 is spaced apart from the spring by the block 13 and the leather buffer 14 which is a common construction. The rigid reinforcing plate 15 is perforated to accommodate the ends of the clips 16, 16 and 17, 17, nuts such as 18, 18 being provided as parts of the clips as is customary in spring construction. In this form, the length of the bearing B is substantially that of the block 13 whereas the length of the reinforcing plate R represents effective resistance to reaction. It is plainly seen here that R is much longer than B.

In the construction shown in Fig. 6 the leaves 20, 21, 22, 23, and 24 are inverted and the load is applied to the ends of the leaf 20. 25 represents the support, for instance, an axle. The ends of the clip 26 pass through a plate 27 which serves as a bearing having a length equal to B. The rigid reinforcing device 28 is provided on the concave side of the spring and has a length R greater than B so as to decrease the effective length of the leaf 20 on the rebound.

In the form shown in Fig. 7 the load is applied to the ends of the leaf 30 and a number of supplementary leaves such as 31, 32, 33, and 34 are provided. The load or frame of the vehicle is represented by the part 35. The support 36 is a part of the running gear or axle which presents a bearing having a length B. A clip 37 passes around the support 36 and has its upper ends secured above the rigid reinforcing plate 38 on the concave side of the spring. In this arrangement the support 36 is nearer one end of the leaf 30 than the other so that the two arms of the spring are of unequal length. The reinforcing plate 38 is arranged to provide two arms of unequal length to correspond substantially to the proportion between the lengths of the arms of the spring. Here it is seen clearly that the length R of the reinforcing device is considerably greater than the length B of the support or bearing.

All the forms shown of my invention permit a longer spring action in the normal load direction and a much shorter spring action on the rebound. This greatly decreases the rebound and thus prevents shock and liability to injury.

This construction provides a shock absorber which restricts reaction without interfering at all with the compression of the spring while other shock absorbers seriously interfere with the compression. My invention is also less expensive to construct and less expensive to install than other shock absorbers known to me. My improvement also reinforces the spring and prevents accidents which might be very serious.

When the construction of my invention is applied for instance to an automobile, the long leaf 1 of the spring presses against the plate 9 when the automobile is unloaded. When the vehicle is loaded and standing at rest the leaf 1 is pressed slightly away from the outer ends of the rigid plate 9 and the spring is therefore free to make all the smaller motions without contacting with the free end of the rigid plate. In its normal action the shorter leaf members coöperate with the long leaf member in supporting the load resiliently. The rigid plate 9 is brought into action only when the excessive reaction or rebound of the load carries the spring back to its normal position of rest and tends to carry it beyond that point. In the reaction the longest leaf member 1 comes gradually into contact with the rigid plate from near the center outward toward the free end of the plate and the reaction is thus gradually checked. If the reaction is not entirely checked by the return of the spring to its normal position in contact with the rigid plate, the continued reaction of the end of the long leaf member and the load causes the long leaf member to flex about the outer end of the rigid plate as a fulcrum as shown in Fig. 8 and the inner portion of the long leaf member tends to be pried away from the plate member as shown in Fig. 8. This is resisted by the shorter leaf members which are thus again placed under compression. It will thus be seen that the shorter leaf members are not only compressed during the normal compression due to the load but also during the abnormal compression due to reaction as illustrated in Fig. 8.

What I claim is:—

1. In a vehicle spring construction, the combination of a curved resilient leaf member, a bearing secured on the convex side thereof and a rigid reinforcing and checking plate secured on the concave side of said resilient leaf member and of substantially greater length than the effective length of said bearing, said reinforcing and checking plate being sufficiently long and sufficiently rigid to serve as a fulcrum at its outer end when the spring reacts and whereby the effective length of the spring under reaction is substantially less than the effective length of the spring under compression, said reinforcing and checking plate gradually decreasing the reaction of said resilient leaf member without decreasing the compression.

2. In a vehicle spring construction, the combination of a plurality of curved resilient leaf members graded in length and free to be compressed, a bearing secured on the convex side and a rigid reinforcing plate of substantially greater length than the effective length of said bearing and secured on the concave side of the resilient leaf members whereby the compression action of the resilient leaf members is unaffected by said reinforcing and checking plate and said plate serves to check the reaction throughout the length of the plate so that the effective length of said leaf members under reaction is substantially less than the effective length of the leaf members under compression and the reaction is checked by said plate and the end of the plate serves as a fulcrum for the longest leaf member so that the portion of the longest member between the fulcrum and the bearing tends to move away from the plate and to compress the shorter leaf member.

3. In a vehicle spring construction, the combination of a plurality of curved resilient leaf members, a bearing on the convex side thereof, a rigid reinforcing and checking plate on the concave side, clips securing said leaf members and said reinforcing and checking plate to said bearing, said reinforcing and checking plate being sufficiently long and sufficiently rigid so that the effective length of the spring under reaction is substantially less than the effective length under compression, said reinforcing and checking plate serving to gradually check the reaction of the spring without shock.

4. In a vehicle spring construction, a plurality of curved resilient leaf members graded in length, a bearing at the convex side and a rigid plate secured at the concave side and conforming to the shape of the adjacent resilient leaf member and of substantially greater length than the effective length of said bearing.

HENRY STERLING CHAPIN.

Witnesses:
ROBT. S. ALLYN,
E. BRADFORD.

Copies of this patent may be obtained for five cents each, by addressing the "Commissioner of Patents, Washington, D. C."